United States Patent [19]

Dennert et al.

[11] 4,430,107
[45] Feb. 7, 1984

[54] METHOD FOR MAKING SHAPED FOAM GLASS BODIES

[75] Inventors: Heinz Dennert, Trosdorfer Weg 6, 8602 Bischberg; Hans V. Dennert, Mozartweg 1, 8602 Schlüsselfeld, both of Fed. Rep. of Germany; Alois Seidl, Lam, Fed. Rep. of Germany

[73] Assignee: Heinz Dennert, Bischberg; Hans Veit Dennert, Schlüsselfeld, Fed. Rep. of Germany

[21] Appl. No.: 367,790

[22] Filed: Apr. 12, 1982

[51] Int. Cl.³ .............................................. C03B 19/08
[52] U.S. Cl. .............................................. 65/22; 106/75; 501/39; 501/85
[58] Field of Search ............... 501/39, 85; 106/75; 65/22

[56] References Cited

U.S. PATENT DOCUMENTS

| 2,123,536 | 7/1938 | Long | 65/22 |
|---|---|---|---|
| 2,156,457 | 5/1939 | Long | 65/22 X |
| 3,321,414 | 5/1967 | Lieli | 65/22 X |
| 3,744,984 | 7/1973 | Sato | 65/22 |
| 3,840,380 | 10/1974 | Kraemer et al. | |
| 3,874,861 | 4/1975 | Kurz | 65/22 X |
| 3,877,954 | 4/1975 | Wüstefeld | 106/75 |

FOREIGN PATENT DOCUMENTS

| 266409 | 11/1968 | Austria. | |
|---|---|---|---|
| 940541 | 1/1974 | Canada | 65/22 |
| 1198816 | 10/1969 | Fed. Rep. of Germany. | |
| 2103263 | 9/1971 | Fed. Rep. of Germany. | |
| 2518383 | 11/1976 | Fed. Rep. of Germany. | |
| 2181619 | 12/1973 | France. | |
| 2311148 | 12/1976 | France. | |
| 490168 | 8/1938 | United Kingdom | 65/22 |
| 1252562 | 11/1971 | United Kingdom. | |

OTHER PUBLICATIONS

"Soviet Radiation-Resistant Foam Glass", Nuclear Engineering, Aug. 1963, p. 285.

*Primary Examiner*—Robert L. Lindsay, Jr.
*Attorney, Agent, or Firm*—Spencer & Frank

[57] ABSTRACT

Method for making shaped foam glass bodies from ground glass by hydrolysis in a hydrolysis mixture with solid alkali silicate and water, in which at least one foaming agent is added to the hydrolysis mixture, or to a resulting slip to form a foam producing mass, and in which the foam producing mass is foamed at an increased temperature. A mixture of two types of glass, namely (a) glass containing more than 16% by weight alkali oxide, and (b) glass containing less than 16% by weight alkali oxide, 95% of each having a grain size of less than 0.1 mm, at a weight ratio of a:b=1:1.5 to 1:20 is mixed with water at temperatures from 50° to 100° C. until the mixture thickens, the ratio of water to total solids being 1:1.4 to 2.5. The resulting mass into shaped foam glass bodies.

12 Claims, No Drawings

METHOD FOR MAKING SHAPED FOAM GLASS BODIES

BACKGROUND OF THE INVENTION

The invention relates to a method for making shaped foam glass bodies.

Shaped foam glass bodies as well as methods for making them are known. The shaped bodies may have the shape of small spheres of plates or differently shaped objects. Spherical foam glass bodies, in particular, are used as insulating agents in the construction industry, but also as floating wicks which absorb oil on water surfaces so as to permit removal of the oil by burning it away. Plate-shaped foam glass bodies can likewise be used as heat and sound insulating materials; they also serve as supports for objects which require heat treatment as well as numerous other purposes.

When producing shaped foam glass bodies, the starting materials, if possible, are those that are inexpensive and available in large quantities. Comminuted waste glass, i.e., for example, comminuted bottles, window panes, wastes from glass factories and the like are particularly suitable. Moreover, it is known to process raw materials existing in nature, such as clays and the like as well as industrial wastes such as ashes or the like. In all cases, the usually finely ground starting material is hydrolyzed by chemical wet treatment, the resulting slip is dried and granulated and the granulate is dried and foamed by heating it to higher temperatures. The necessary expansion agent may be added already to the hydrolysis mixture; it is also known, however, to add the expansion agent to the slip at a later time.

German Patent No. 2,151,232 discloses a process for making a water containing product of mixed silicates for use as a raw material for the production of foam glass in plate or granulate form. To produce the raw product, chunky alkali silicate produced by melting (so-called piece glass) is filled together with water and powdered and/or fibrous alkali soluble oxidic and/or silicate starting material into a roller autoclave and is heated by introducing steam. The weight ratio of the alkali silicate to the glass or the like to be hydrolized is 1:0.02 to 0.8. During the introduction of the steam, the autoclave content is heated and brought to elevated pressures of 1 to 5 atmospheres gauge. This causes the chunky alkali silicate to slowly go into solution and, because of the waterglass solution in statu nascendi, the oxidic and/or silicate substances are dissolved, i.e. hydrolized. The hydrolysis process takes several hours, during which the mass must always remain flowable so as to be able to be moved in the roller autoclave. The resulting slip is then dried and the resulting powdery product is processed further in a known manner into shaped foam glass bodies.

SUMMARY OF THE INVENTION

It is the object of the invention to improve the prior art method so as to be able to practice it, on the one hand, in the shortest possible time and, on the other hand, without the use of autoclaves and while saving energy. For this purpose, it is proposed that a mixture of two types of glass, i.e., (a) glass containing more than 16 percent by weight alkali oxide;
(b) glass containing less than 16 percent by weight alkali oxide, 95% of each having a grain size less than 0.1 mm, are mixed at a weight ratio of $a:b = 1:1.5$ to $1:20$ with water at temperatures of 50 to preferably 95° C. until the mixture thickens, the ratio of water to total solids being 1:1.4 to 2.5, and the resulting mass is processed further into shaped foam glass bodies.

DETAILED DESCRIPTION OF THE INVENTION

In contrast to the process disclosed by German Patent No. 2,151,232, the process now starts with two types of finely ground glass, of which one type contains more than 16 percent by weight alkali oxide and the other less than 16 percent by weight alkali oxide. Glass type (a) (more than 16% by weight alkali oxide) includes the conventional piece glass, although other types of glass melted specifically for this purpose can also be used. Moreover, the quantity of water is reduced considerably so that, in implementation of the process, the energy balance is improved. With the stated measures, the use of an autoclave is not required and work can proceed at normal pressure. The necessary movement of the hydrolysis mass is effected by stirring. Instead of stirring, measures having the same effect, such as circulating by pumping, refiner treatment and the like, can also by used. In the course of the treatment, usually already after a few minutes, the mass begins to thicken so that a slip results which flows with difficulty or not at all. This slip can now be processed into shaped bodies, for example granulates, by introducing dried and, if necessary, ground or coarse-ground oversize or undersize grains and can be dried and foamed immediately by heating it to higher temperatures.

The process offers the already mentioned advantages, namely its implementation in a simple stirring vessel, i.e. without the need for an autoclave, and a much shorter reaction time compared to the prior art process. However, it is also significant that the process can be implemented not only with comminuted solid alkali silicate, so-called piece glass, but that mixed alkali silicates can also be used. It is known that piece glass must be produced from pure quartz sand by melting with soda or the like and that consequently it is relatively expensive. The mixed alkali silicates that can be used in the present process can also be produced from contaminated sands and are therefore less expensive. In corresponding experiments it has additionally been found that the use of mixed alkali silicates instead of piece glass leads to even better and particularly to more water resistant products.

According to a preferred embodiment of the invention, it is proposed to add as the mixed alkali silicate a glass containing more than 16% alkali oxide and at least one oxide of a multivalent metal in quantities of at least 1 percent by weight. It has been found to be favorable to use a mixed alkali silicate containing more than 16% alkali oxide and 1 to 10% earth alkali oxide, $Al_2O_3$ and/or $Fe_2O_3$.

A further improvement of the disclosed process can be realized if an expansion agent mixture in quantities of up to 10 percent by weight (with reference to the solids) is added to the mixture of the starting material or to the slip produced therefrom, the expansion agent mixture comprising, in addition to a substance which furnishes an organic C, an agent which releases oxygen at temperatures around 600° to 700° C. "Gas releasing agents"

are here understood to mean those substances which release $SO_2$ or $CO_2$ at the stated temperatures. Sodium sulfate can be used as the $SO_2$ releasing agent; calcium carbonate or barium carbonate can be used as the $CO_2$ releasing agent.

As the preferred composition it is recommended to use an expansion agent mixture of 2 parts by weight pyrolusite, 3 parts by weight $Na_2SO_4$, 3 parts by weight sugar or the equivalent quantity of another substance which furnishes C. The proposed process variation employing an expansion agent mixture permits the foaming of the possibly granulated slip in two stages. Already at relatively low temperatures around 600° to 700° C., the C combustion begins, forming $CO_2$ as the expanding gas. The mass thus begins to expand already at a relatively low temperature. If the temperature were increased further, the usual, single-stage expansion agent mixtures would be spent. The mixture proposed here, however, is reactivated at temperatures around 700° to 900° C., in that the existing sodium sulfate then releases oxygen while being reduced to sodium sulfide, so that again an organic substance combusts and furnishes $CO_2$ as the expanding gas. However, other compositions are possible for the expansion agent. For example, a combination of 1% pyrolusite, 0.5% sugar, 2% $CaCO_3$, 1% $BaCO_3$ has also been found satisfactory. The result in either case are shaped foam glass bodies of a low specific weight. In these shaped foam glass bodies are to be made firmer and heavier, without significantly increasing their price per cubic meter, it is possible to fill them with inert powdery materials which during the hydrolysis or foaming phase react not at all or only slightly with the glass meals or the expansion agents, such fillers being, for example, quartz meal, stone powders, electrofilter ashes, high melting point ground slag or other inexpensive powdered waste materials.

The proposed process will be explained in greater detail below with the aid of three embodiments.

EXAMPLE 1

760 kg of waste bottle glass and 180 kg of a specially melted glass comprising 68% $SiO_2$, 27% $Na_2O$, 5% other metal oxides, are ground in a mill to a grain size or less than 0.1 mm. This quantity of glass is stirred in a mixing vessel together with 30 kg $Na_2SO_4$, 30 kg sugar and 20 kg pyrolusite (70% $MnO_2$) and 600 kg water for 40 minutes at 90° C. Then, 500 kg undersize and finely ground oversize grains are added to the thickened mixture and the speed of the stirrer is increased. This causes most of the total mixture to be granulated to grain sizes from 0.5 to 2.0 mm. After emptying the stirring vessel, the granulate is dried while passing through a cylindrical rotary kiln heated to 300° C. The granulate leaving the rotary kiln is separated in a sifting machine into undersize, oversize and useful grains. The undersize grains and the oversize grains, which have been comminuted in a breaker, are returned to a storage silo and used for granulation. The useful grains are mixed with 20 percent by weight clay meal and expanded at 780° C. to five times their volume in a foaming cylinder. After separation of the excess separating agent, one cubic meter of the resulting granulate has a weight of 125 kg and grain sizes from 4 to 6 mm.

EXAMPLE 2

840 kg of bottle glass stemming from a recycling process, 96% of which has grain sizes below 0.1 mm and 4% of which has grain sizes of more than 0.1 mm, are filled into a stirring vessel together with 100 kg of a specially melted, poor quality glass of the same grain size, comprising 64% impure sand, 30% $Na_2O$ and 6% other metal oxides, 28 kg $Na_2SO_4$, 30 kg glycerin and 21 kg pyrolusite comprising 80% $MnO_2$, and with 700 liters of boiling water and are stirred for 30 minutes. Then 600 kg undersize and finely ground oversize grains are added to this mixture and the speed of the stirrer is increased to four times its original speed. The resulting granulate is dried in hot air on a vibratory bed at 250° C., is then separated by sifting into undersize, oversize and useful grains. The useful grains are foamed within narrow fractional ranges in a cylindrical rotary kiln at 790° C. by adding 10 percent by weight cement. In a cooling cylinder which is able to receive one hour's output of the rotary kiln, the foam glass granulate is cooled to room temperature before it is blown into a silo. A granulate having a grain size from 4 to 8 mm has a bulk weight of about 130 kg/m$^3$.

EXAMPLE 3

880 kg of waste bottle glass and 90 kg of a specially melted glass comprising 68% $SiO_2$, 27% $Na_2O$, 5% other metal oxides, are ground in a mill to a grain size of less than 0.1 mm. The quantity of glass meal is stirred in a stirring vessel together with 40 kg $CaCO_3$, 10 kg sugar and 10 kg pyrolusite (70% $MnO_2$) and 500 kg water for 40 minutes at 90° C. Then 500 undersize and finely ground oversize grains are added to the thickened mixture and the speed of the stirrer is increased. This granulates the majority of the total mixture to grain sizes of 0.5 to 2.0 mm. After emptying the stirring vessel, the granulate is dried while passing through a cylindrical rotary kiln heated to 300° C. The granulate leaving the rotary kiln is separated in a sifting machine into undersize, oversize and useful grains.

The undersize grains and the oversize grains, which have been comminuted in a breaker, are returned to a storage silo and used for granulation. The useful grains are mixed with 20 percent by weight clay meal and expanded to five times their original volume in an expanding cylinder at 850° C. After separating the excess separating agent, one cubic meter of the resulting granulate has a weight of 130 kg and grain sizes from 4 to 6 mm.

Further examples in which the technical process conditions were the same as in the above examples resulted in particularly low volumetric weights of 0.10 to 0.20 g/cm$^3$.

We claim:
1. Method for making shaped foam glass bodies from ground glass by hydrolysis in a hydrolysis mixture with solid alkali silicate and water, in which at least one foaming agent is added to the hydrolysis mixture, or to a resulting slip to form a foam producing mass, and in which the foam producing mass is foamed at an increased temperature, comprising:

mixing a mixture of two types of glass namely
      (a) glass containing more than 16% by weight alkali oxide,
      (b) glass containing less than 16% by weight alkali oxide,
    95% of each having a grain size of less than 0.1 mm, at a weight ratio of $$a:b = 1:1.5 \text{ to } 1:20$$

with water at temperatures from 50° to 100° C. until the mixture thickens, the ratio of water to total solids being 1:1.4 to 2.5, and processing further the resulting mass into shaped foam glass bodies.

2. Method according to claim 1, wherein the type of glass (a) added is a mixed alkali silicate containing more than 16% alkali oxide and at least one oxide of a multivalent metal in quantities of at least 1 percent by weight.

3. Method according to claim 1 or 2, wherein the type of glass (a) added is a mixed alkali silicate containing more than 16 percent by weight alkali oxide and 1 to 10 percent by weight earth alkali oxide, $Al_2O_3$ and/or $Fe_2O_3$.

4. Method according to claim 1, wherein, an expansion agent mixture in quantities up to 10 percent by weight (with reference to the solids) is added to the mixture of the starting material or to the slip produced therefrom, said expansion agent containing, in addition to a substance furnishing organic C, an agent which releases oxygen at temperatures around 600° to 700° C. and a further agent which releases $SO_2$ or $CO_2$ at temperatures around 700° to 900° C.

5. Method according to claim 4, wherein sodium sulfate is used as the $SO_2$ releasing agent.

6. Method according to claim 4, wherein calcium carbonate or barium carbonate is used as the $CO_2$ releasing agent.

7. Method according to claim 4, wherein an expansion agent mixture of the following composition:

2 parts by weight pyrolusite, 3 parts by weight $Na_2SO_4$, 3 parts by weight sugar or the equivalent quantity of another C releasing organic substance, is added to the mixture of the starting glasses or to the slip produced therefrom in quantities of up to 10 percent by weight (with reference to the solids).

8. Method according to claim 1, wherein the mixing is performed at normal pressure.

9. Method according to claim 1, wherein the temperature of the mixing is from 50° to 95° C.

10. Method according to claim 1, wherein the slip is granulated before the foam producing mass is formed.

11. Method according to claim 1, wherein fillers are added to the hydrolysis mixture or to the resulting slip.

12. Method according to claim 1, wherein the mixing is performed at normal pressure and the temperature of the mixing is from 50° to 95° C.

* * * * *